No. 729,395. PATENTED MAY 26, 1903.
A. C. NIEMANN.
FRUIT SORTER.
APPLICATION FILED FEB. 4, 1902.
NO MODEL. 2 SHEETS—SHEET 1.
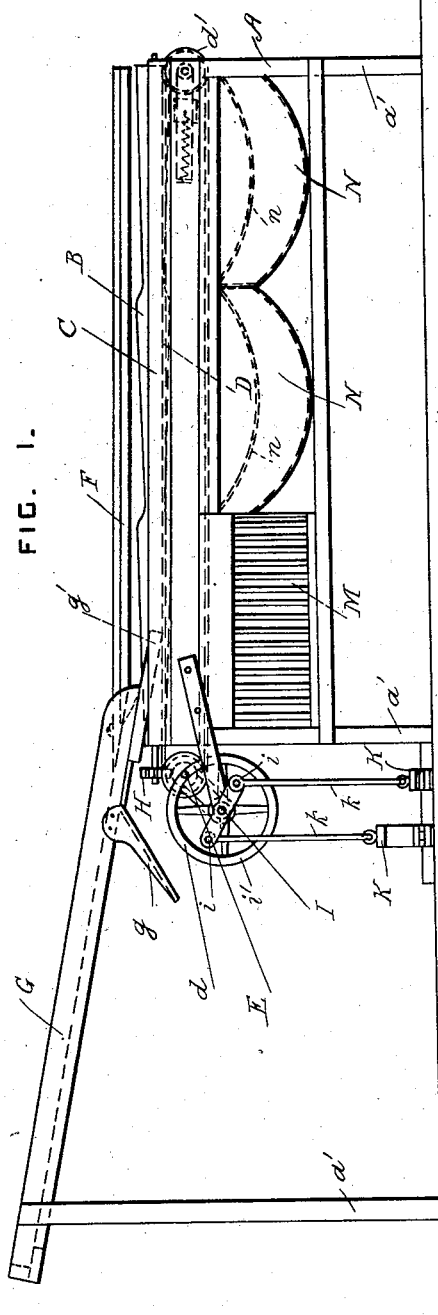
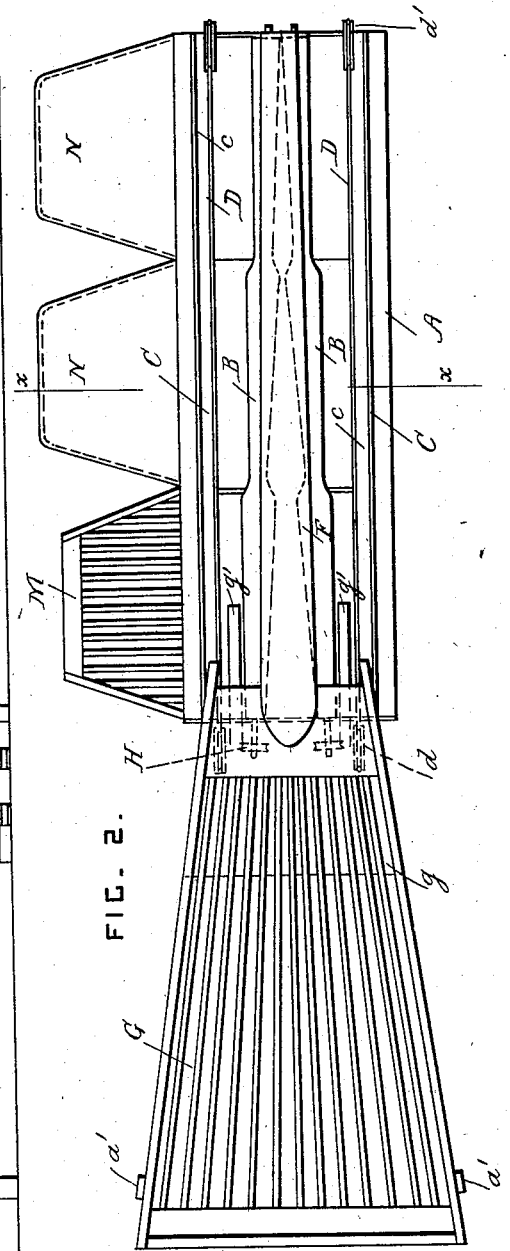
WITNESSES
INVENTOR
Attorney

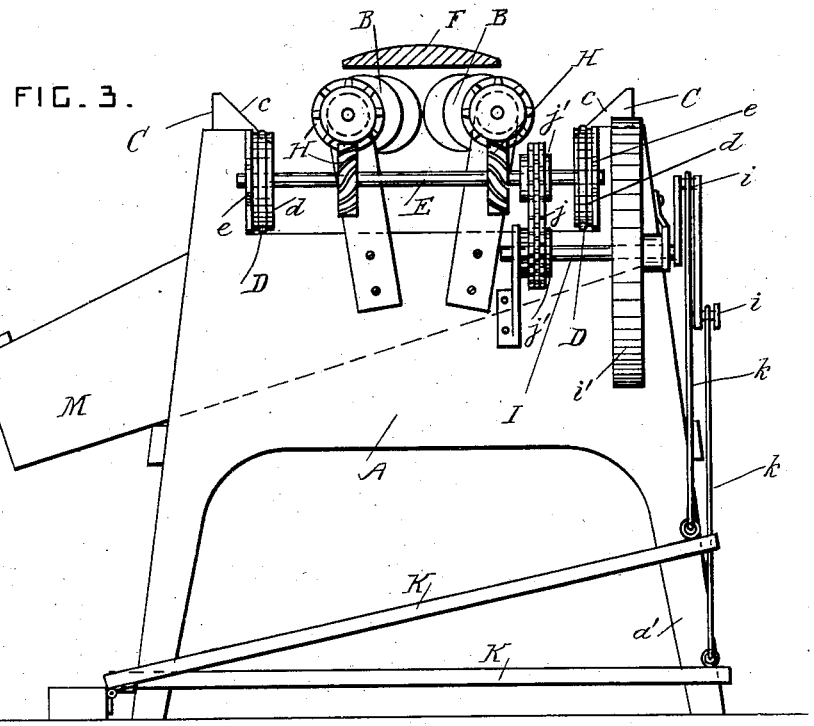
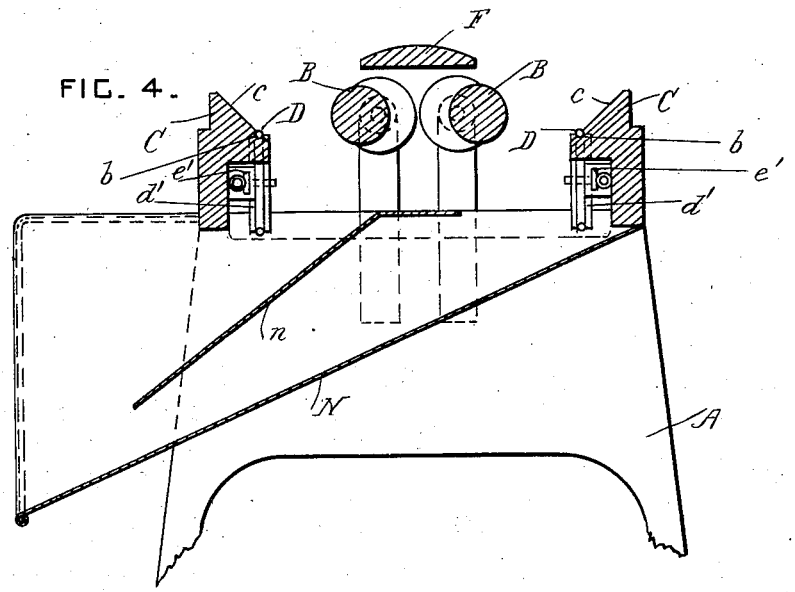

No. 729,395. Patented May 26, 1903.

UNITED STATES PATENT OFFICE.

AUGUST C. NIEMANN, OF PORT CLINTON, OHIO.

FRUIT-SORTER.

SPECIFICATION forming part of Letters Patent No. 729,395, dated May 26, 1903.

Application filed February 4, 1902. Serial No. 92,497. (No model.)

*To all whom it may concern:*

Be it known that I, AUGUST C. NIEMANN, a citizen of the United States, residing at Port Clinton, in the county of Ottawa and State of Ohio, have invented certain new and useful Improvements in Fruit-Sorters; and I do hereby declare the following to be a full, clear, and exact description of the invention, such as will enable others skilled in the art to which it appertains to make and use the same.

This invention relates to sorters and graders for fruit, onions, and other substantially round articles; and it consists in the novel construction and combination of the parts hereinafter fully described and claimed.

In the drawings, Figure 1 is a longitudinal section through the machine. Fig. 2 is a plan view of the machine. Fig. 3 is an end view showing the driving mechanism. Fig. 4 is a cross-section taken on the line $x\,x$ in Fig. 2.

A is the frame of the machine, which is supported on legs $a'$.

B represents the grading-rollers, which are journaled longitudinally in the frame A. Each roller B consists of a series of cones.

C represents parallel guides secured to the frame. The axes of the rollers B are set at an angle to the guides, so that the sides of the cones are parallel with the guides, each cone being at a different distance from the guide to which it pertains and the fruit being graded by falling through the spaces between the cones and the guide. The cones are revolved continuously, and their conical shape causes the fruit which passes over them to be turned over with a twisting motion.

The guides C have inclined faces $c$ for the fruit to rest against, and D represents endless conveyers arranged longitudinally of the machine in grooves $b$ at the bottom edges of the guides.

The conveyers D are formed of cords, belts, wire ropes, or any other approved form of conveyer-band and are supported by sheaves $d$ and $d'$. The sheaves $d$ are secured on the driving-shaft E of the machine, which is journaled in bearings $e$ at its receiving end. The sheaves $d'$ are carried by spring-pressed brackets $e'$ at the other end of the machine, so that the cords are always kept taut. The fruit is moved longitudinally of the machine by contact with the conveyers.

F is a guard secured to the table or frame at one end and projecting longitudinally of the machine between and above the rollers B. This guard prevents any fruit from falling between the two rollers.

G is the receiving table or chute, which is arranged at one end of the machine. This table is provided with slats arranged in an inclined position and provided with pads or coverings of soft material on their upper sides, so that the fruit may not be bruised when poured onto the table from baskets. The dirt and rubbish mixed with the fruit falls through the slats of the receiving-table, and $g$ is an inclined board under the table, which prevents any dirt from falling onto the driving mechanism. Inclined projecting lips $g'$ are provided at the bottom of the table, which let the fruit roll gently down onto the guides and rollers.

H represents toothed driving-wheels, which connect the driving-shaft E with the rollers B. The driving-shaft E is revolved in any approved manner.

I is a crank-shaft journaled in brackets secured to the frame and provided with cranks $i$ and a fly-wheel $i'$. The crank-shaft is connected with the driving-shaft by a drive-chain $j$ and sprocket-wheels $j'$ or any other approved driving connection.

K represents treadles which are connected with the cranks $i$ by rods $k$.

The fruit is caught in suitable hoppers as it falls from the grading-rollers and guides. A separate hopper is provided for each grade of fruit, and the rollers are furnished with as many cones as desirable. The smallest and hardest fruit, such as peaches, falls into a hopper M or chute formed of slats which allow the dirt to fall between them. These slats are provided with pads or cushions on their upper sides, so that the fruit will not be bruised when it falls on them. The larger fruit is preferably caught in hoppers or chutes N, of canvas or other textile material. These hoppers extend crosswise under both rollers, and in order that the fruit which falls from one roller may not fall on the fruit rolling down the hopper each hopper is provided with an inclined false bottom $n$, of canvas or other textile material. The canvas hoppers are supported by suitable frames of rods or stout wire and are furnished with flaps at their outlet ends, which are let down, so that the fruit may be received into suitable receptacles for removal and shipment.

What I claim is—

1. In a sorting-machine, the combination, with a guide, and a conveyer for moving the articles longitudinally of the guide; of a roller formed of a series of cones having their larger ends arranged toward the discharge of the machine, said roller being mounted in the same general plane with the said guide but with its axis inclined thereto at an angle sufficient to place the adjacent surfaces of its cones substantially parallel to the said guide and at different distances from it, substantially as set forth.

2. In a sorting-machine, the combination, with a guide having an inclined face, and an endless conveyer having its upper portion arranged at the bottom of the inclined face of the said guide; of a roller formed of a series of cones having their larger ends arranged toward the discharge of the machine, said roller being mounted in the same general plane with the said guide but with its axis inclined thereto at an angle sufficient to place the adjacent surfaces of its cones substantially parallel to the said guide and at different distances from it, substantially as set forth.

3. In a sorting-machine, the combination, with guides and sorting-rollers arranged side by side, of a main hopper or chute extending crosswise of the machine under the said rollers, and an auxiliary chute or false bottom arranged under one of the said rollers and discharging into the delivery end of the said main hopper, substantially as set forth.

In testimony whereof I affix my signature in presence of two witnesses.

AUGUST C. NIEMANN.

Witnesses:
C. L. BRAUCHER,
SCOTT STAHL.